(12) United States Patent
Lundgren (10) Patent No.: US 11,408,147 B2
(45) Date of Patent: Aug. 9, 2022

(54) DYNAMIC OPEN CENTER HYDRAULIC SYSTEM CONTROL

(71) Applicant: NORDHYDRAULIC AB, Kramfors (SE)

(72) Inventor: Bertil Lundgren, Bjaertra (SE)

(73) Assignee: NORDHYDRAULIC AB, Kramfors (SE)

( * ) Notice: Subject to any disclaimer, the term of this patent is extended or adjusted under 35 U.S.C. 154(b) by 205 days.

(21) Appl. No.: 16/630,095

(22) PCT Filed: Jul. 9, 2018

(86) PCT No.: PCT/EP2018/068545
§ 371 (c)(1),
(2) Date: Jan. 10, 2020

(87) PCT Pub. No.: WO2019/011860
PCT Pub. Date: Jan. 17, 2019

(65) Prior Publication Data
US 2020/0165797 A1 May 28, 2020

(30) Foreign Application Priority Data

Jul. 14, 2017 (SE) .................................... 1750922-5
Jul. 14, 2017 (SE) .................................... 1750923-3

(51) Int. Cl.
| | | |
|---|---|---|
| F15B 13/08 | (2006.01) | |
| E02F 9/22 | (2006.01) | |
| F15B 1/02 | (2006.01) | |
| F15B 11/042 | (2006.01) | |
| F15B 15/20 | (2006.01) | |
| F15B 21/08 | (2006.01) | |

(Continued)

(52) U.S. Cl.
CPC ............ *E02F 9/2267* (2013.01); *F15B 1/021* (2013.01); *F15B 11/042* (2013.01);
(Continued)

(58) Field of Classification Search
CPC .. F15B 2211/41563; F15B 2211/50536; F15B 2211/45; F15B 2211/6346; F15B 11/165
See application file for complete search history.

(56) References Cited

U.S. PATENT DOCUMENTS 5,680,760 A * 10/1997 Lunzman .............. E02F 9/2228
60/426
6,173,572 B1 * 1/2001 Cobo .................... E02F 9/2203
60/327

(Continued)

FOREIGN PATENT DOCUMENTS

| | | |
|---|---|---|
| EP | 1 403 527 | 3/2004 |
| JP | 60-175804 | 9/1985 |
| WO | 02/46021 | 6/2002 |

OTHER PUBLICATIONS

Open Center Hydraulic Systems NPL (Year: 2020).*

(Continued)

*Primary Examiner* — Dustin T Nguyen
(74) *Attorney, Agent, or Firm* — Wenderoth, Lind & Ponack, L.L.P.

(57) ABSTRACT

A hydraulic valve control unit is for an open center hydraulic system including a pump, a shunt valve and one or more actuator valves coupled to the shunt valve. Each actuator valve controls a corresponding actuator's position. The hydraulic valve control unit has a processor and a memory, containing instructions executable by the processor, and is configured to obtain user input data indicative of a desired actuator's position, determining opening area values of the one or more actuator valves using a predetermined relation dependent on the user input data, determining an opening area value of the shunt valve using the predetermined relation dependent on the user input data, controlling the shunt valve based on the opening area value of the shunt valve, and controlling the one or more actuator valves based (Continued)

on the opening area values of the one or more actuator valves.

6 Claims, 9 Drawing Sheets

(51) Int. Cl.
   *F16K 11/00* (2006.01)
   *F15B 19/00* (2006.01)
(52) U.S. Cl.
   CPC .......... *F15B 11/0423* (2013.01); *F15B 13/08* (2013.01); *F15B 15/20* (2013.01); *F15B 21/08* (2013.01); *F16K 11/00* (2013.01); *E02F 9/2203* (2013.01); *E02F 9/2217* (2013.01); *F15B 19/00* (2013.01); *F15B 2211/20576* (2013.01); *F15B 2211/30525* (2013.01); *F15B 2211/30565* (2013.01); *F15B 2211/327* (2013.01); *F15B 2211/426* (2013.01); *F15B 2211/50536* (2013.01); *F15B 2211/6346* (2013.01); *F15B 2211/6654* (2013.01); *F15B 2211/7053* (2013.01)

(56) References Cited

U.S. PATENT DOCUMENTS

| | | | |
|---|---|---|---|
| 7,331,175 B2* | 2/2008 | VerKuilen | E02F 9/2242 60/429 |
| 7,614,335 B2* | 11/2009 | Gradea | E02F 9/2225 91/444 |
| 9,303,387 B2* | 4/2016 | Pfaff | F15B 11/0423 |
| 10,655,650 B2* | 5/2020 | Werner | F15B 13/08 |
| 2002/0070071 A1 | 6/2002 | Schuh | |
| 2004/0055288 A1 | 3/2004 | Pfaff et al. | |
| 2014/0116038 A1 | 5/2014 | Pfaff et al. | |
| 2020/0141089 A1* | 5/2020 | Muraoka | E02F 9/2296 |

OTHER PUBLICATIONS

International Search Report (ISR) dated Oct. 19, 2018 in International (PCT) Application No. PCT/EP2018/068545.
Swedish Examination Report dated Feb. 12, 2018 in Sweden Patent Application No. 1750922-5.
Swedish Examination Report dated Apr. 2, 2019 in Sweden Patent Application No. 1750922-5.

* cited by examiner

DYNAMIC OPEN CENTER HYDRAULIC SYSTEM CONTROL

FIELD OF THE INVENTION

The present invention relates to an open center hydraulic system and a hydraulic valve control unit for the open center hydraulic system.

BACKGROUND OF THE INVENTION

Hydraulic systems for vehicles typically comprise a pump, a tank and one or more valve assemblies comprising a shunt valve and an actuator valve coupled to the shunt valve. The actuator valve is typically controlling a corresponding actuator's position. Open center hydraulic system is often used to denote such a system where the hydraulic fluid is constantly flowing from the pump to the tank regardless if the actuator is activated or not. The pump is typically powered by the vehicles engine and is therefore providing a relatively constant fluid flow, though typically varying with the engines revolutions per minute, RPM.

In a typical conventional open center hydraulic system, a valve assembly is assigned to each function controlled by a hydraulic actuator. In other words the valve assembly functionality such as meter in control of the hydraulic actuator and/or meter out control of the hydraulic actuator is typically controlled simultaneously with the shunt control. This functionality may be implemented in the same valve spool. Effectively, this functionality means that the relative relation between the opening area of the spool valve and the opening area of the meter in and/or meter out valve is fixed once the valve assembly is manufactured. A disadvantage of such conventional hydraulic systems is that the functionality of the valve assembly is always mutually dependent. A further disadvantage of such conventional hydraulic systems is that the flow of oil is not used in an efficient manner.

In some conventional hydraulic systems, a hydraulic valve control unit and electric valve spool actuators are introduced to try and improve efficiency of the system. However, these types of systems suffer from the same drawbacks as mentioned previously.

Thus, there is a need for an improved open center hydraulic system and a hydraulic valve control unit for the open center hydraulic system.

SUMMARY OF THE INVENTION

An objective of embodiments of the present invention is to provide a solution that mitigates or solves the drawbacks and problems described above.

The above objective is solved by the subject matter of the invention. Further advantageous implementation forms of the present invention can be found herein. According to a first aspect of the invention, the above mentioned and other objectives are achieved with a hydraulic valve control unit for an open center hydraulic system. The open center hydraulic system comprises a pump, a shunt valve and one or more actuator valves coupled to the shunt valve. Each actuator valve controls a corresponding actuator's position. The hydraulic valve control unit comprises a processor and a memory containing instructions executable by the processor. The hydraulic valve control unit is configured to obtain user input data indicative of at least a desired actuator's position, determining opening area values of the one or more actuator valves using a predetermined relation dependent on the user input data, determining an opening area value of the shunt valve using the predetermined relation dependent on the user input data, controlling the shunt valve based on the opening area value of the shunt valve, and controlling the one or more actuator valves based on the opening area values of the one or more actuator valves.

According to a second aspect of the invention, the above mentioned and other objectives are achieved with an open center hydraulic system. The open center hydraulic system comprises a hydraulic valve control unit according to the first aspect, a pump, a shunt valve and one or more actuator valves coupled to the shunt valve. Each actuator valve controls a corresponding actuator's position.

Further applications and advantages of the present invention will be apparent from the following detailed description.

Other objects, advantages and salient features of the present invention will become apparent from the following detailed description, which, taken in conjunction with the drawings, discloses preferred embodiments of the present invention.

BRIEF DESCRIPTION OF THE DRAWINGS

Referring to the drawings that form a part of this disclosure.

DETAILED DESCRIPTION OF THE INVENTION

An "or" in this description and the corresponding claims is to be understood as a mathematical OR which covers "and" and "or", and is not to be understand as an XOR (exclusive OR). The indefinite article "a" in this disclosure and claims is not limited to "one" and can also be understood as "one or more", i.e., plural.

The expressions desired actuator's position, desired actuator's movement and desired actuator's speed is used interchangeably herein.

Figure 1:
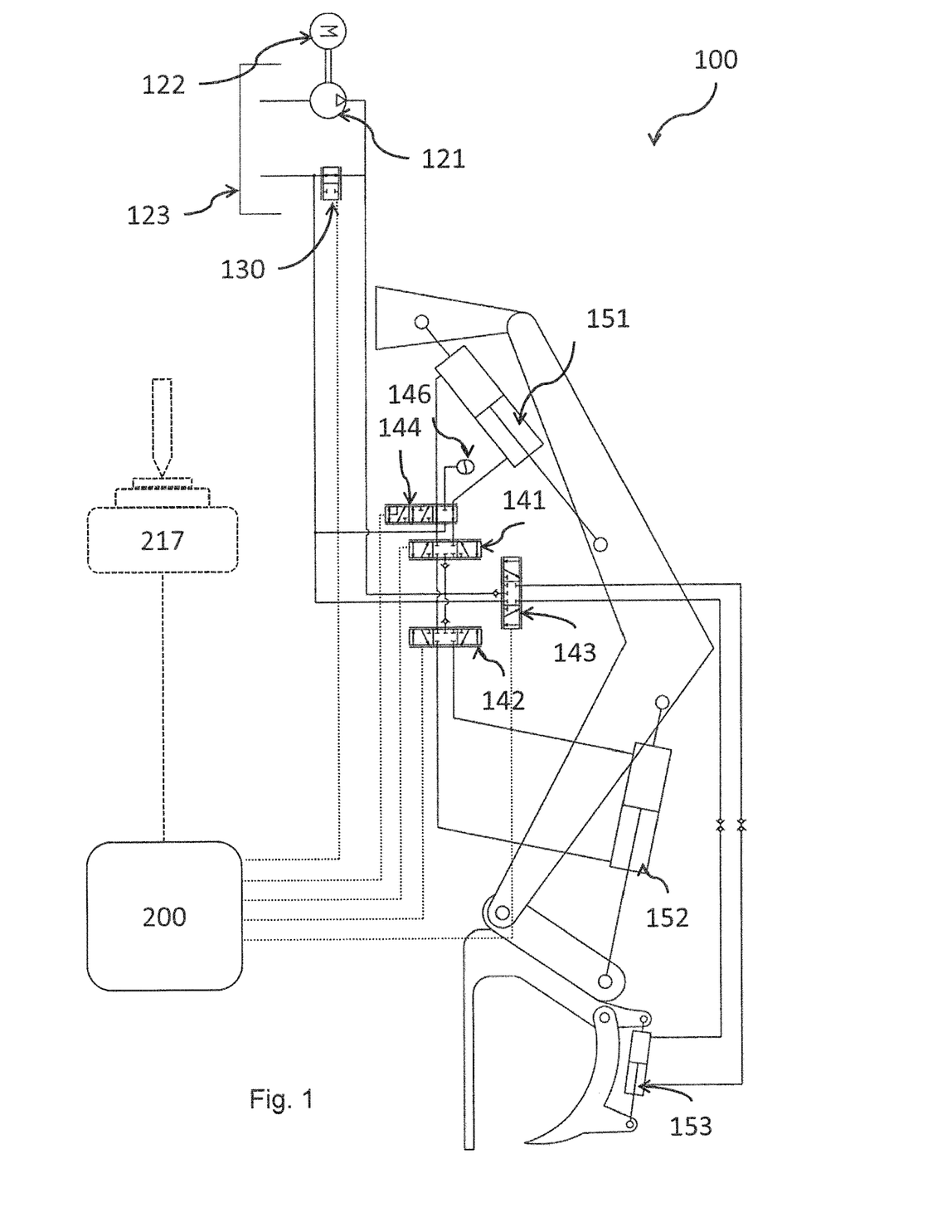
FIG. 1 is a graphical circuit diagram of an open center hydraulic system according to one or more embodiments of the present disclosure.

FIG. 1 shows an open center hydraulic system 100 according to an embodiment of the present disclosure. The open center hydraulic system 100 comprises a hydraulic valve control unit 200, a shunt valve 130 and one or more actuator valves 141-143 coupled to the shunt valve. Each of the one or more actuator valves 141-143 may be controlling a corresponding actuator's 151-153 position, e.g. the position of a hydraulic cylinder configured to move from a first end position to a second end position. The shunt valve 130 and the one or more actuator valves 141-143 are each provided with a valve servo unit (not shown in the figure), the valve servo unit comprising control circuitry, such as a processor and a memory, and an electric actuator controlled by the control circuitry configured to control the respective valve, e.g. to move a valve spool comprised in the valve. The control circuitry of the valve servo unit controls the respective electric actuator based on a control signal received from the hydraulic valve control unit 200. The hydraulic valve control unit 200 is communicatively coupled to the valve servo unit of the shunt valve 130 and to each of the valve servo units of the one or more actuator valves 141-143.

The hydraulic valve control unit 200 is configured to send one or more control signals to valves comprising a valve servo unit in response to a control signal received from an input device 217. The input device is typically configured to receive input or indications from a user indicative of at least a desired actuator's 151-153 position and send a control signal or user-input signal indicative of the user input or indications to the hydraulic valve control unit 200.

The open center hydraulic system 100 may further comprise any selection of a hydraulic fluid pump 121, one or more actuators 151-153, a hydraulic fluid tank 123 and an engine 122 powering the pump 121.

The input port of the shunt valve 130 is coupled to the output port of the pump 121 and to each of the one or more actuator valves 141-143. The output port of the shunt valve 130 is coupled to the tank. The shunt valve 130, and thus effectively the output port of the pump 121, may be coupled directly to an actuator valve 141-143 in a meter in configuration and/or coupled to the actuator valve 141-143 via an actuator 151-153 in a meter out configuration. Each of the one or more actuator valves 141-143 may be coupled to a respective actuator 151-153 in a meter in configuration and/or in a meter out configuration.

Optionally, the open center hydraulic system 100 may further comprise one or more function valves 144 coupled in between an actuator valve 141-143 and it's corresponding actuator 151-153. The function valve 145 is configured to be activated or deactivated in response to a control signal received from the hydraulic valve control unit 200, e.g. comprising an electric controllable valve. When activated, an accumulator coupled to or comprised in the function valve 144 dampens variations in hydraulic fluid pressure, e.g. using an accumulator 146.

Figure 2:
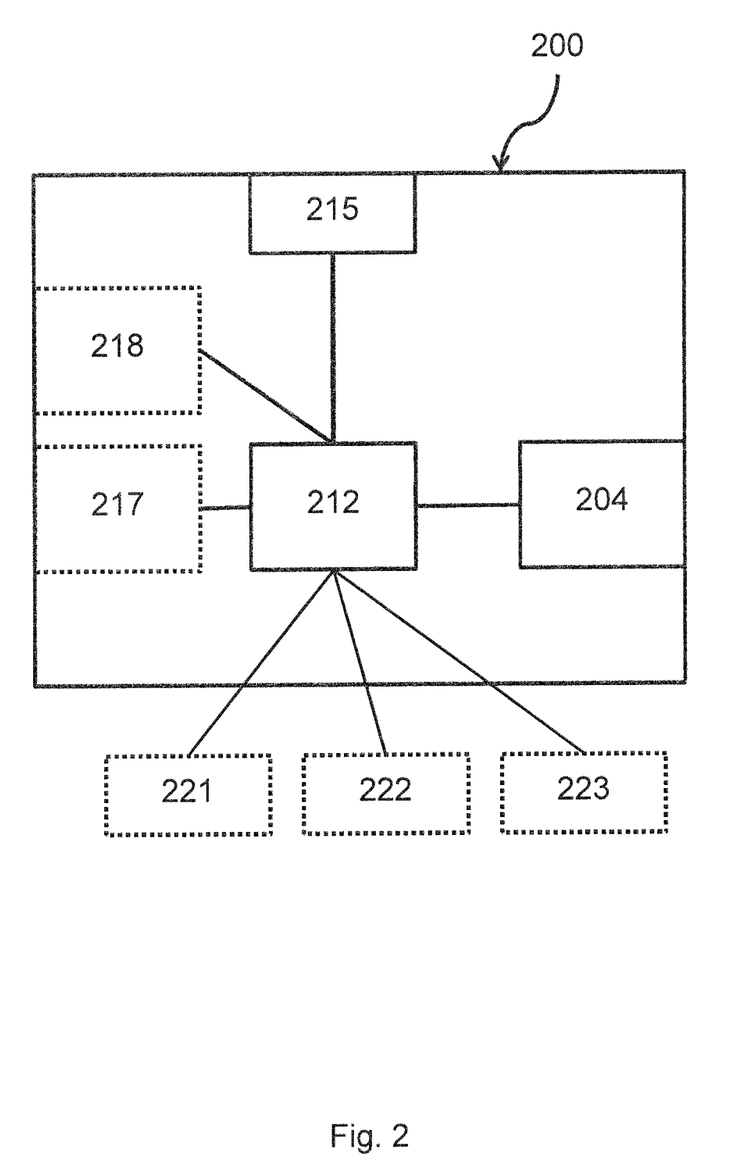
FIG. 2 is a graphical circuit diagram of a hydraulic valve control unit according to one or more embodiments of the present disclosure.

FIG. 2 shows a hydraulic valve control unit 200 according to an embodiment of the present disclosure. The hydraulic valve control unit 200 may be in the form of an Electronic Control Unit, a server, an on-board computer, a vehicle mounted computer system or a navigation device. The hydraulic valve control unit 200 may comprise a processor or processing means 212 communicatively coupled to a transceiver 204 for wired or wireless communication. Further, the hydraulic valve control unit 200 may further comprise at least one optional antenna (not shown in figure). The antenna may be coupled to the transceiver 204 and is configured to transmit and/or emit and/or receive a wireless signals, e.g. in a wireless communication system, e.g. send/receive control signals and/or sensor data to/from the one or more environment sensors 221-223 or any other control unit or sensor. In one example, the processor 212 may be any of a selection of processing circuitry and/or a central processing unit and/or processor modules and/or multiple processors configured to cooperate with each other. Further, the hydraulic valve control unit 200 may further comprise a memory 215. The memory 215 may contain instructions executable by the processor to perform the methods described herein.

The processor 212 may be communicatively coupled to a selection of any of the transceiver 204, the one or more environment sensors 221-223 and the memory 215. The hydraulic valve control unit 200 may be configured to send/receive the control signals and/or the sensor data directly from the one or more environment sensors 221-223 or via a wired and/or wireless communications network.

In one or more embodiments, the hydraulic valve control unit 200 may further comprise an input device 217, configured to receive input or indications from a user and send a control signal or user-input signal indicative of the user input or indications to the processing means 212.

In one or more embodiments the hydraulic valve control unit 200 may further comprise a display 218 configured to receive a display signal indicative of rendered objects, such as text or graphical user input objects, from the processing means 212 and to display the received signal as objects, such as text or graphical user input objects.

In one embodiment the display 218 is integrated with the user input device 217 and is configured to receive a display signal indicative of rendered objects, such as text or graphical user input objects, from the processing means 212 and to display the received signal as objects, such as text or graphical user input objects, and/or configured to receive input or indications from a user and send a user-input signal indicative of the user input or indications to the processing means 212.

In embodiments, the processor/processing means 212 is communicatively coupled to a selection of any of the memory 215 and/or the communications interface and/or transceiver and/or the input device 217 and/or the display 218 and/or the one or more environment sensors 221-223. In embodiments, the transceiver 204 communicates using wired and/or wireless communication techniques.

In embodiments, the one or more memory 215 may comprise a selection of a hard RAM, disk drive, a floppy disk drive, a flash drive or DVD drive (R or RW), or other removable or fixed media drive or memory. In a further embodiment, the hydraulic valve control unit 200 may further comprise and/or be coupled to one or more additional sensors (not shown in the figure) configured to receive and/or obtain and/or measure physical properties pertaining to the open center hydraulic system 100 and send one or more sensor signals indicative of the physical properties to the processing means 212, e.g. second sensor data indicative of ambient temperature around the open center hydraulic system.

The hydraulic valve control unit 200 may be configured to alternatively or additionally obtain sensor data by calculating the sensor data based on received and/or retrieved sensor data, e.g. received and/or retrieved from the one or more environment sensors 221-223, such as a hydraulic flow sensor 221-223 or engine 122 RPM sensor.

The control signals and/or the sensor data may be sent/received directly to/from a management server, directly to/from the shunt valve 130 or directly to/from the one or more open center actuator valves 141-143 or directly to/from the one or more environment sensors 221-223 or via the wired and/or wireless communications network. A wireless communications network may comprise e.g. any of a Bluetooth, WiFi 802.11X, GSM, UMTS, LTE or LTE advanced communications network or any other wired or wireless communication network known in the art.

In an embodiment, the hydraulic valve control unit 200 is configured to obtain user input data indicative of at least a desired actuator's 151-153 position. User input data may be obtained by receiving a control signal or a user-input signal comprising the user input data from the input device 217, e.g. a joystick, keyboard, touchscreen, button or any other suitable input device 217 known in the art. Alternatively or additionally, the user input data may be obtained by retrieving the user input data from memory, e.g. memory 215. In one example, a pre-programmed motion pattern for an actuator is retrieved from memory. Alternatively or additionally, the user input data may be obtained by calculating the user input data based on sensor data and/or data retrieved from memory. In an embodiment, the hydraulic valve control unit 200 is configured to obtain user input data indicative of operational mode, e.g. low flow operational mode, single action operational mode and depressurization operational mode.

In one example, the user moves a joystick from a central idle position or 0% all the way forward or 100%, thereby indicating he wants an associated hydraulic actuator to be moved at full speed towards an end position. Associating the input device 217 to hydraulic actuators is known in the art, e.g. via a data structure such as a table, and is not further discussed herein. User input data indicative of this desired position or positions is then sent as a control signal from the joystick or input device 217 to the hydraulic valve control unit 200.

Optionally, the hydraulic valve control unit 200 may further be configured to obtain a predetermined relation, e.g. by retrieving the predetermined relation from memory. The predetermined relation may be indicative of opening area of the shunt valve 130 and the one or more open center actuator valves 141-143 based on the user input data. The user input data may, as previously described, be indicative one or more desired positions of one or more of the actuators 151-153. Thus, the predetermined relation may be indicative of the opening area of the shunt valve 130 and the opening area of the one or more open center actuator valves 141-143 based on a single desired position, e.g. X %, or a plurality of desired positions, e.g. X %, Y %, Z %. The plurality of desired positions X %, Y %, Z % may e.g. be provided by multiple joysticks or multi-dimensional joysticks. The opening area may be expressed as an area and/or as a longitudinal displacement of the valve spool along an axis and/or as a position of a stepping motor. The predetermined relation dependent on the user input data may be implemented as a function or table stored in memory. The predetermined function may be based on a desired actuator position and/or positions indicated by the user data and provide one or more opening area values within a range, e.g. to provide A1 within the range $[A1_{min}\text{-}A1_{max}]$. Examples of predetermined relations are further described in relation to FIG. 4-8.

The hydraulic valve control unit 200 is further configured to simultaneously or in close succession determine an opening area value of the shunt valve 130 using the predetermined relation dependent on the user input data. In one example, a relative desired position of "forward" is given by moving a joystick half way forward from a resting or idle position, thereby indicating a desired position of 50%. A first area can then, in one example, be determined using the predetermined relation $A1=A1_{min}+(A1_{max}-A1_{min})\times 50\%$, i.e. opening the actuator valve to half open if $A1_{min}=0$ (fully closed). An opening area $AS_{max}$ of the shunt valve 130 is also determined using the predetermined relation $AS=AS_{min}-(AS_{max}-AS_{min})\times 50\%$, i.e. opening the shunt valve to valve to half open.

As the shunt valve 130 leads hydraulic fluid from the output port of the pump 121 to the tank 123, it will be controlled by the valve control unit 200 to the maximum opening area $AS_{max}$ when the open center hydraulic system 100 is in an idle state, e.g. no pressure or fluid flow is provided to the actuator valves. When the open center hydraulic system 100 is in a fully active state, the shunt valve 130 will be controlled by the valve control unit 200 to the minimum opening area $AS_{min}$, thus assuring that the maximum controllable fluid pressure or fluid flow is provided to the actuator valves.

Figure 3A:
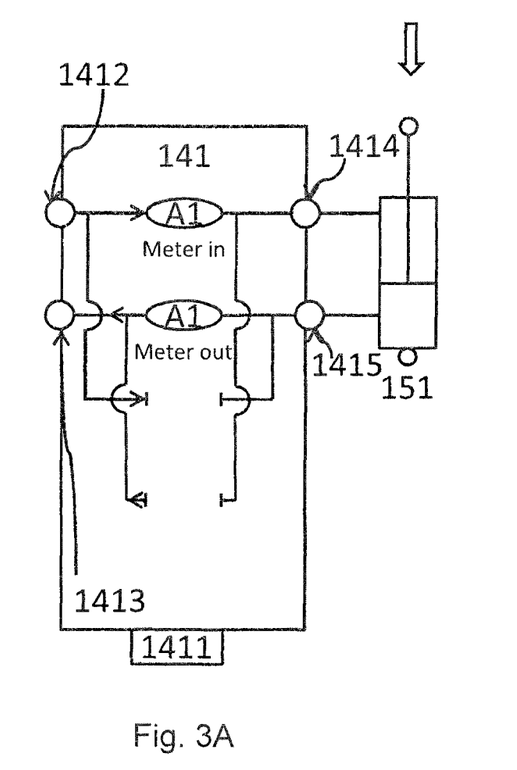
FIG. 3A-C are graphical circuit diagrams of an actuator valve and a shunt valve being controlled according to one or more embodiments of the present disclosure.

FIG. 3A shows an actuator valve 141, 142 controlled to move the corresponding actuator 151, 152 in a first direction. The actuator valve may comprise a pump port 1412, 1422 and a first actuator output port 1414, 1424. The actuator valve may further comprise a second actuator output port 1415, 1425 and a tank port 1413, 1423. The actuator valve may further comprise a valve spool (not shown in the figure). The valve spool is configured adjust or adapt an opening area A1, A2 between the pump port 1412, 1422 and the first actuator port 1414, 1424 and between the second actuator port 1415, 1425 and the tank port 1413, 1423 when positioned within a first position range. The valve spool is further configured adjust or adapt an opening area A1, A2 between the pump port 1412, 1422 and the second actuator port 1415, 1425 and between the first actuator port 1414, 1424 and the tank port 1413, 1423 when positioned within a second position range. The actuator valve may further comprise a valve servo unit 1411, 1412 configured to adapt or adjust the opening area A1, A2, e.g. by moving the valve spool as further described above.

Figure 3B:
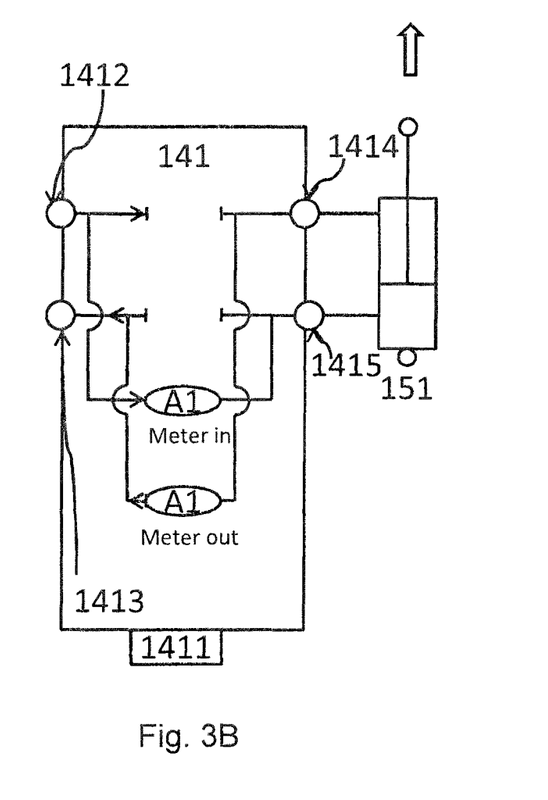

FIG. 3B shows an actuator valve controlled to move the corresponding actuator 151, 152 in a direction opposite to the first direction. The valve spool is configured adjust or adapt an opening area A1, A2 between the pump port 1412, 1422 and the second actuator port 1415, 1425 and between the first actuator port 1414, 1424 and the tank port 1413, 1423. The first actuator port 1414, 1424 and the second actuator port 1415, 1425 can typically be used to connect to corresponding hydraulic actuator 151, 152 in a meter-in configuration and/or meter-out configuration. The actuator valves may be connected to the actuator in any suitable configuration of meter in configuration/meter out configuration.

Figure 3C:
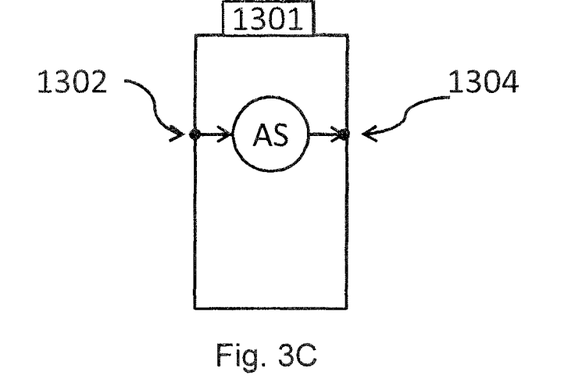

FIG. 3C shows a shunt valve 130 controlled to regulate the fluid flow of the pump 121 to the one or more open center actuator valves 141-143. The pump port 1302 of the shunt valve 130 is coupled to the output port of the pump 121 and to each of the one or more actuator valves 141-143. The tank port 1304 of the shunt valve 130 is coupled to the tank 123. The shunt valve 130 may further comprise a valve spool (not shown in the figure). The valve spool of the shunt valve 130 is configured adjust or adapt an opening area AS between the pump port 1302 of the shunt valve 130 and the tank port 1304 of the shunt valve 130. The shunt valve 130 may further comprise a valve servo unit 1301 configured to adapt or adjust the opening area AS, e.g. by moving the valve spool as further described above.

Figure 4:
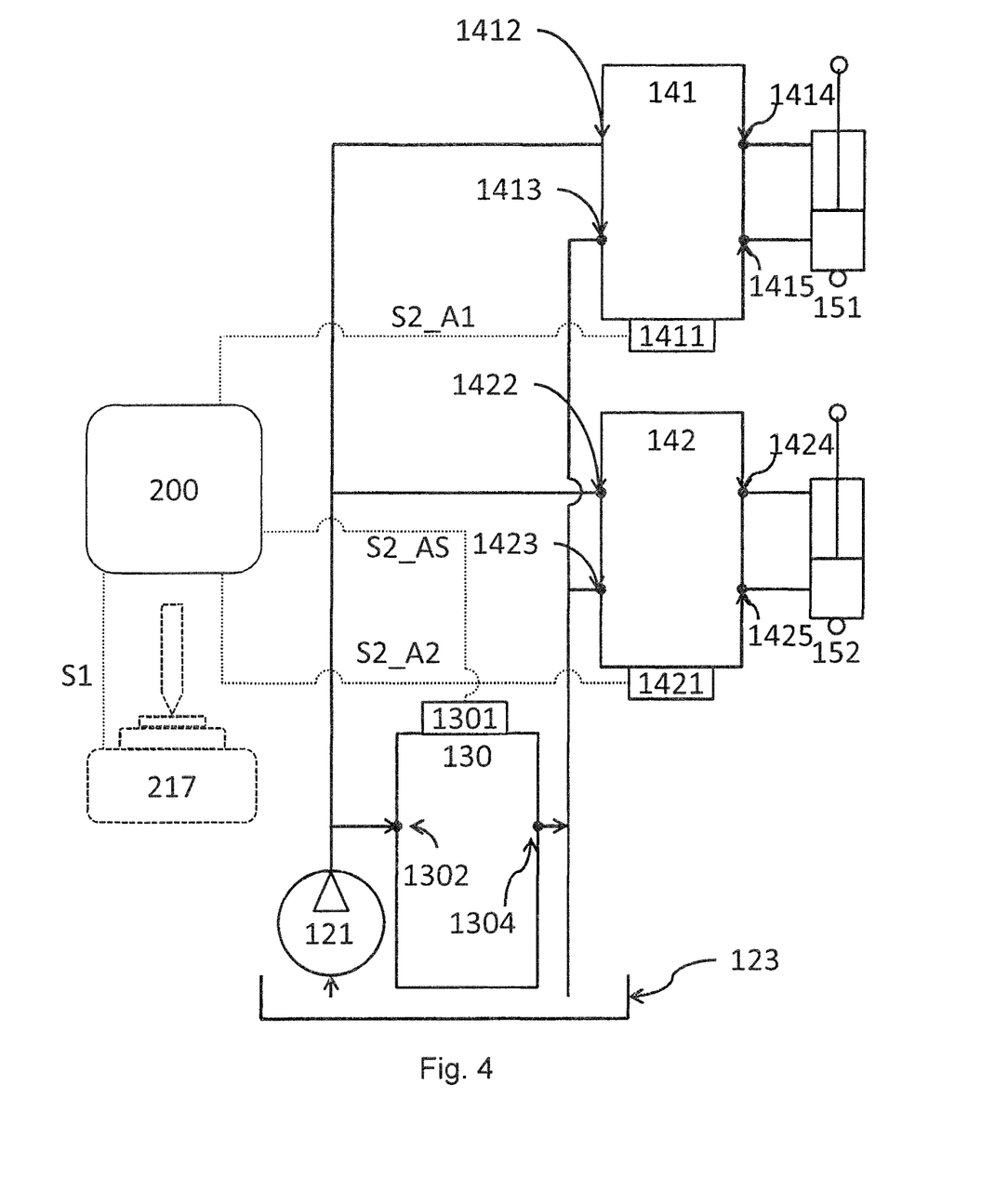
FIG. 4 is a graphical circuit diagram of an example of how the shunt valve and the one or more actuator valves are controlled based on control signals according to one or more embodiments of the present disclosure.

FIG. 4 illustrates an example of how the shunt valve 130 and the one or more actuator valves 141-143 are controlled based on control signals comprising the determined open area values AS, A1, A2 according to one or more embodiments of the invention. A control signal S1 is sent from the input device 217, depicted in FIG. 4 as a joystick, and comprising user data indicative of one or more desired actuator's positions. The hydraulic valve control unit 200 determines an opening area value AS of the shunt valve 130, an opening area value A1 of the first actuator valve 141 and an opening area value A2 of the second actuator valve 142 based on the one or more desired actuator's positions. A control signal S2_AS indicative of the opening area value AS of the shunt valve is sent to the valve servo unit 1301 comprised in the shunt valve 130. A third control signal S2_A1 indicative of the opening area value A1 of the first actuator valve 141 is sent to the valve servo unit 1411 comprised in the first actuator valve 141. A control signal S2_A2 indicative of the opening area value A2 of the second actuator valve 142 is sent to the valve servo unit 1421 comprised in the second actuator valve 142. The valve servo unit 1301 comprised in the shunt valve 130 controls the shunt valve, e.g. the valve spool of the shunt valve, to provide an opening area of the shunt valve AS, as indicated by the control signal S2_AS. The valve servo unit 1411 comprised in the first actuator valve 141 controls the first actuator valve 141, e.g. the valve spool of the first actuator valve 141, to provide an opening area A1 of the first actuator valve 141 as indicated by the control signal S2_A1. The valve servo unit 1421 comprised in the second actuator valve 142 controls the second actuator valve 142, e.g. the valve spool of the second actuator valve 142, to provide an opening area A2 of the second actuator valve 142 as indicated by the control signal S2_A2. It is understood that the actuator valves may alternatively be coupled to the respective actuator in meter in and/or meter out configuration without deviating from the present disclosure.

In one example, the control circuitry of the valve servo unit 1301 comprised in the shunt valve 130 receives the control signal S2_AS from the hydraulic valve control unit 200 indicative of the opening area AS of the shunt valve 130 and controls the valve spool via the electric valve actuator, e.g. a stepping motor, to provide the opening area AS of the shunt valve 130. The control circuitry of the valve servo unit 1411-1421 comprised in one of the one or more actuator valves 141-143 receives the control signal S2_A1, S2_A2 from the hydraulic valve control unit 200 indicative of the opening area A1, A2 of the actuator valve and controls the valve spool via the electric valve actuator, e.g. a stepping motor, to provide the opening area A1-A2 of the actuator valve 141-143.

Figure 5:
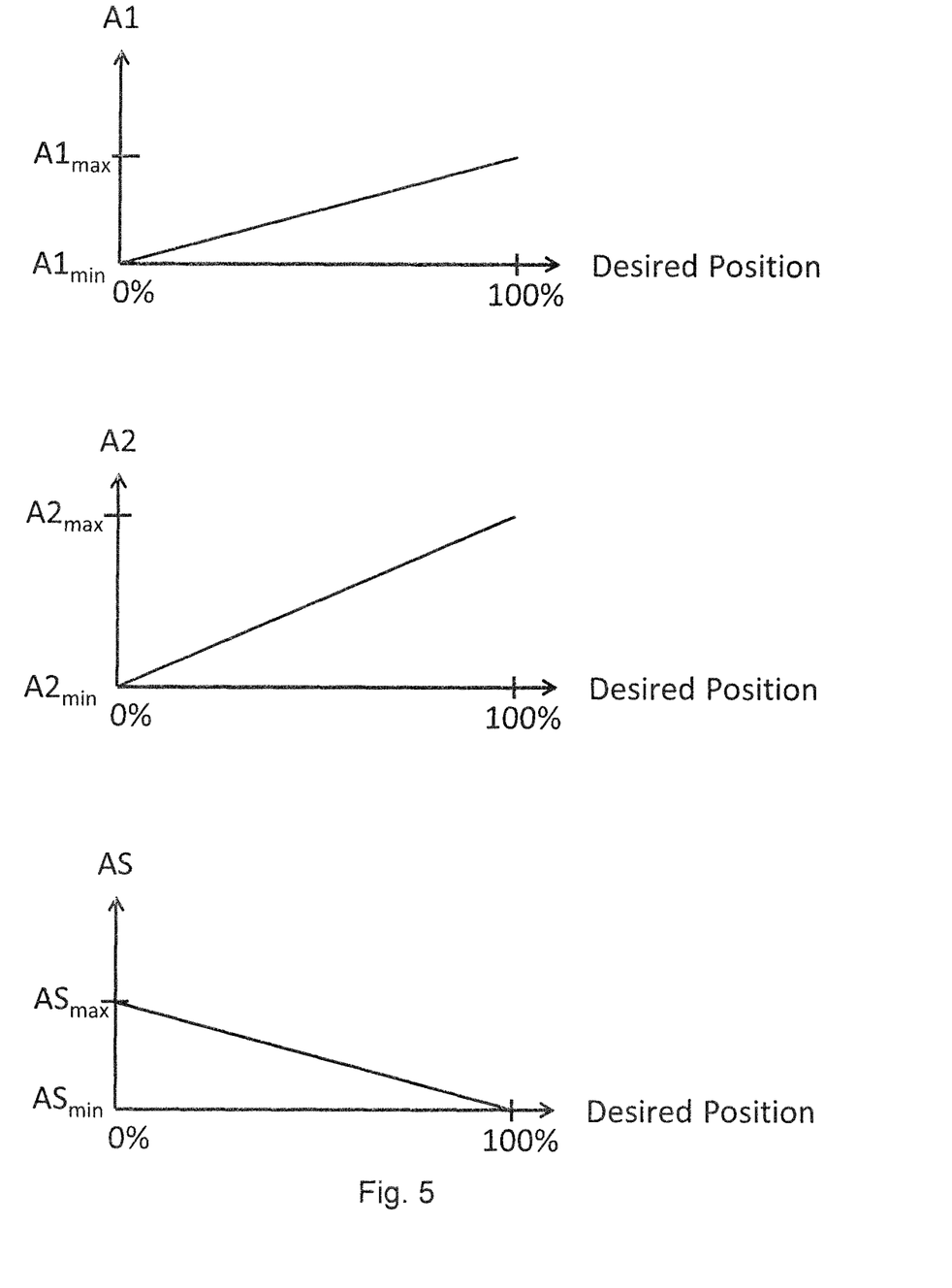
FIG. 5 provides graphs a predetermined relation according to one or more embodiments of the present disclosure.

FIG. 5 illustrates a predetermined relation according to one or more embodiments of the present disclosure. FIG. 5 shows a first part of the predetermined relation as a diagram or graph with a horizontal axis showing a desired actuator's 151-153 position as a percentage between 0% and 100%. The diagram has a vertical axis showing the corresponding determined opening area A1 of the first actuator valve 141.

FIG. 5 further illustrates a second part of the predetermined relation. FIG. 5 shows the second part of the predetermined relation as a diagram or graph with a horizontal axis showing the desired actuator's 151-153 position as a percentage between 0% and 100%. The diagram has a vertical axis showing the corresponding determined opening area A2 of the second actuator valve 142.

FIG. 5 further illustrates a third part of the predetermined relation. FIG. 5 shows the third part of the predetermined relation as a diagram or graph with a horizontal axis showing the desired actuator's 151-153 position as a percentage between 0% and 100%. The diagram has a vertical axis showing the corresponding determined opening area AS of the shunt valve 130.

In one example, a joystick may be moved from a centered or idle position corresponding to a desired position of 0% to a position fully forward corresponding to a desired position of 100%. The opening areas $A1_{min}$, $A2_{min}$ and $AS_{min}$ may be equal to 0 $mm_2$ and the opening areas $A1_{max}$, $A2_{max}$, $AS_{max}$ may be equal to 10 $mm^2$.

The input device 217 may initially be in an idle position, corresponding to 0%. The opening area A1 of the first actuator valve 141 would then be determined to $A1=A1_{min}+(A1_{max}-A1_{min})\times 0\%=A1_{min}$. The opening area A2 of the second actuator valve 142 would then be determined to $A2=A2_{min}+(A2_{max}-A2_{min})\times 0\%=A2_{min}$. The opening area AS of the shunt valve 130 would then be determined to $AS=AS_{max}-(AS_{max}-AS_{min})\times 0\%=AS_{max}$, e.g $A1=A2=0$ $mm^2$ and $AS=10$ $mm^2$.

The joystick may then be moved to indicate a desired position of 25%. The opening area A1 of the first actuator valve 141 would then be determined to $A1=A1_{min}+(A1_{max}-A1_{min})\times 25\%=2.5$ $mm^2$. The opening area A2 of the second actuator valve 142 would then be determined to $A2=A2_{min}+(A2_{max}-A2_{min})\times 25\%=2.5$ $mm^2$. The opening area AS of the shunt valve 130 would then be determined to $AS=AS_{max}-(AS_{max}-AS_{min})\times 25\%=7.5$ $mm^2$. Any suitable relation from one or more desired actuator's 151-153 positions to the opening area AS of the shunt valve 130 and the opening area A1 of the first actuator 141 and the opening area A2 of the second actuator 142 may be considered.

The one or more desired actuator's 151-153 positions comprised in the user input data is for the sake of clarity in the figure shown as one-dimensional, 0%-100%. It is understood that the input data may indicate multiple desired actuator's 151-153 positions simultaneously, e.g. by moving a multi-dimensional joystick or by moving multiple joysticks, where the predetermined relation may be extended to each of these dimensions without deviating from the scope of the invention.

Figure 6:
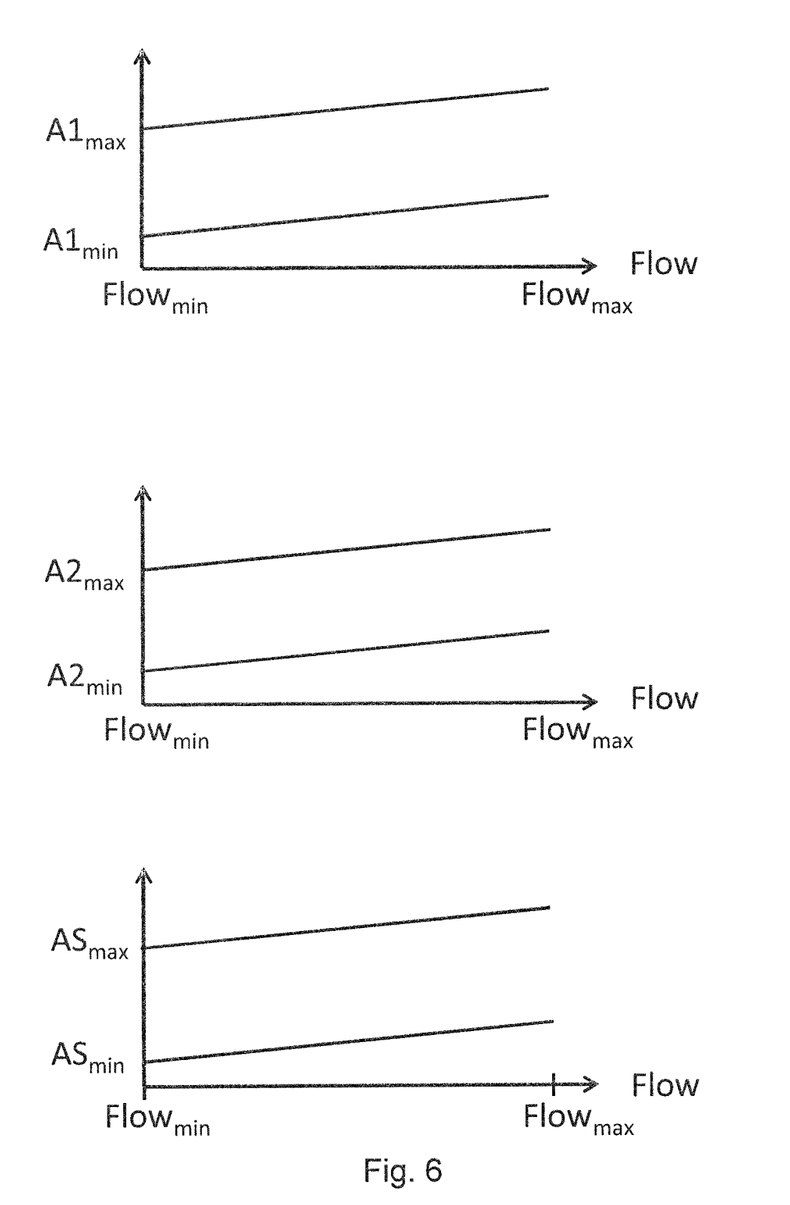
FIG. 6 provides graphs illustrating how the predetermined relation is adapted dependent on the output flow of the pump according to one or more embodiments of the present disclosure.

FIG. 6 shows how the predetermined relation is further dependent on the output flow of the pump according to one or more embodiments of the present disclosure. In a further embodiment of the predetermined relation, the variation in fluid flow from the pump 121 is compensated for. The hydraulic valve control unit 200 is further configured to obtain sensor data indicative of a hydraulic fluid output flow of the pump 121, e.g. as a fluid flow-rate or as Revolutions Per Minute of the motor 122. The sensor data indicative of hydraulic fluid output flow of the pump 121 may be obtained from an environment sensor 221-223 measuring flow of hydraulic fluid or RPM of the engine 122. The predetermined relation may further be dependent on the output flow of the pump. In one embodiment, the hydraulic valve control unit 200 is further configured to adapt the minimum opening area $AS_{min}$ of the shunt valve and/or the maximum opening area $AS_{min}$ of the shunt valve 130 dependent on the sensor data indicative of flow of hydraulic fluid or RPM of the engine 122. Additionally or alternatively, the hydraulic valve control unit 200 is further configured to adapt a minimum opening area $A1_{min}$, $A2_{min}$ of one or more of the actuator valves 141, 142 dependent on the sensor data indicative of flow of hydraulic fluid or RPM of the engine 122. Typically the opening areas are adapted proportional to the flow of hydraulic fluid or RPM of the engine 122, .e.g. using the relation opening area=flow of hydraulic fluid*k m, where k is a predetermined constant and m is a predetermined offset. In one example, the flow of hydraulic fluid is at a nominal level, e.g. the engine at idle RPM. The opening area AS of the shunt valve and the opening areas of the one or more of the actuator valves 141, 142 are then at a nominal value. When the flow of hydraulic fluid is doubled, the hydraulic valve control unit 200 then doubles the nominal opening areas AS of the shunt valve and/or doubles the nominal opening areas of the one or more of the actuator valves 141, 142.

In an embodiment, the hydraulic valve control unit is configured to repeat the preceding steps.

Figure 7:
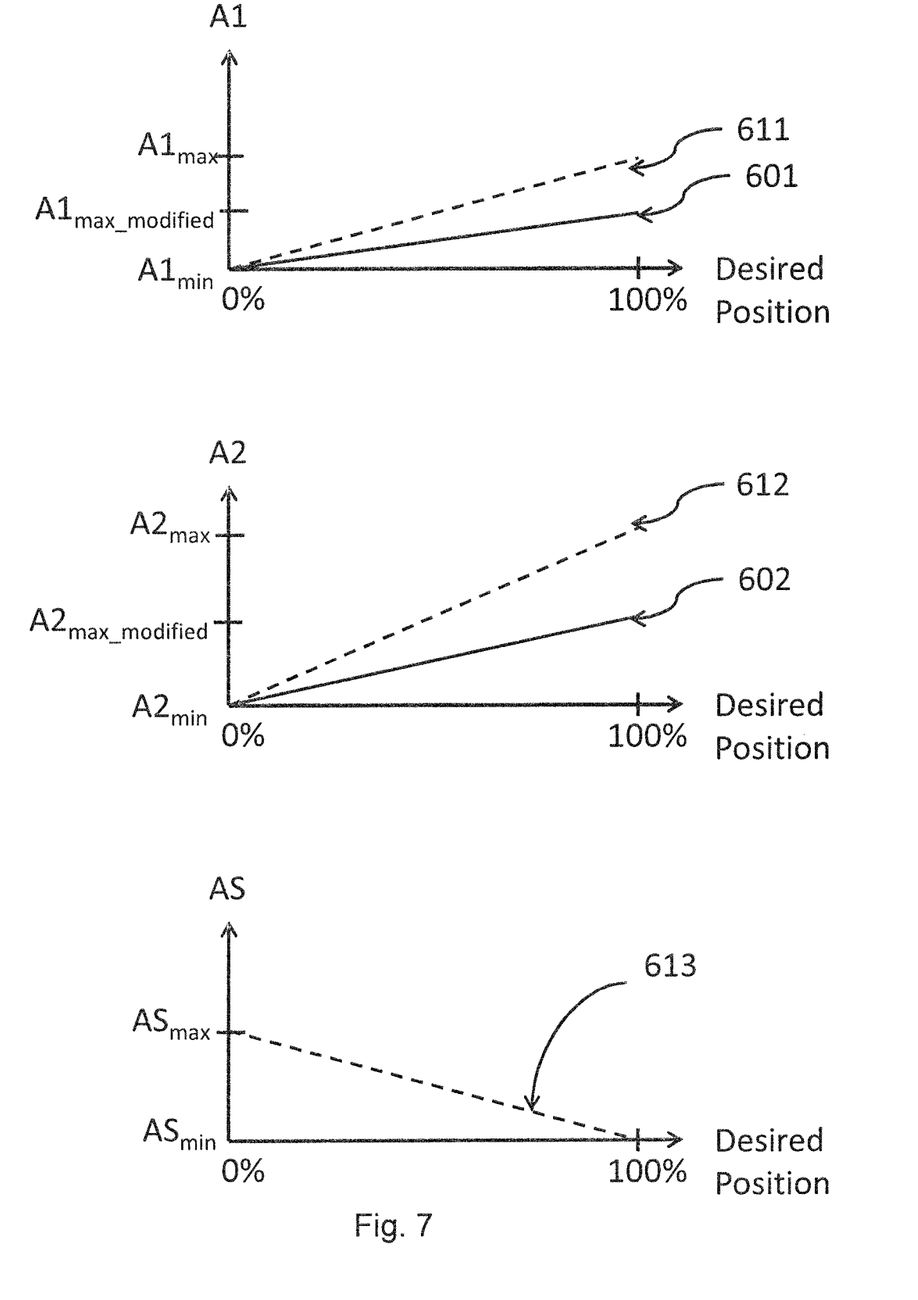
FIG. 7 provides graphs illustrating the predetermined relation when operating in high pressure low flow operational mode according to one or more embodiments of the present disclosure.

FIG. 7 shows the predetermined relation when operating in high pressure low flow operational mode according to one or more embodiments of the present disclosure. In an embodiment, the user input data is further indicative of a desired high pressure low flow operational mode. Further, the predetermined relation is further dependent on the high pressure low flow operational mode. In an embodiment, the predetermined relation provides decreased opening area values 601, 602 of the one or more actuator valves relative to a nominal opening area value 611, 612 of the one or more actuator valves, e.g. as shown in relation to FIG. 5.

In an example, the user input data may further be indicative of a user's desire to operate in high pressure low flow operational mode, i.e. a desire for the hydraulic actuators to operate with strong force and/or high precision/small movements or speed. This indication may be provided by pressing and holding a button, e.g. on a joystick. A modified predetermined relation can then be used to determine the opening area values of the one or more actuator valves 141-143.

In an embodiment, the method may further comprise generating a modified predetermined relation and determine the opening area values of the one or more actuator valves 141-143 based on the modified predetermined relation.

In FIG. 7, a nominal predetermined relation, symbolized by the dashed lines 611, 612 is shown, e.g. similar to the predetermined relation described in relation to FIG. 5. The modified predetermined relation, symbolized by lines 601 and 602, may then be generated based on the nominal predetermined relation. In the example shown in FIG. 7, the predetermined relation or nominal predetermined relation is directly proportional to the desired position, i.e. a straight line, and having the maximum opening area $A1_{max}$ of the first actuator valve 141, the maximum opening area $A2_{max}$ of the second actuator valve 142 and the maximum opening area $AS_{max}$ of the shunt valve 130, e.g. as further described in relation to FIG. 5. A modified predetermined relation is then generated by introducing a decreased maximum opening area $A1_{max\_modified}$ of the first actuator valve 141 and a decreased maximum opening area $A2_{max\_modified}$ of the second actuator valve 142. The modified predetermined relation is further generated by generating the modified predetermined relation based on $A1_{max\_modified}$ and, $A2_{max\_modified}$. In the example shown in FIG. 7, the modified predetermined relation is further based on the minimum opening area $A1_{min}$ of the first actuator valve 141 and the minimum opening area $A2_{min}$ of the second actuator valve 142, e.g. as illustrated by the lines 601 and 602 joining ($A1_{min}$, 0%) to ($A1_{max\_modified}$, 100%) and ($A2_{min}$, 0%) to ($A2_{max\_modified}$, 100%).

It should be appreciated that the predetermined relation need not to be linear and could assume any shape or form where the nominal relation may be reshaped or scaled in a similar manner as described above.

Figure 8:
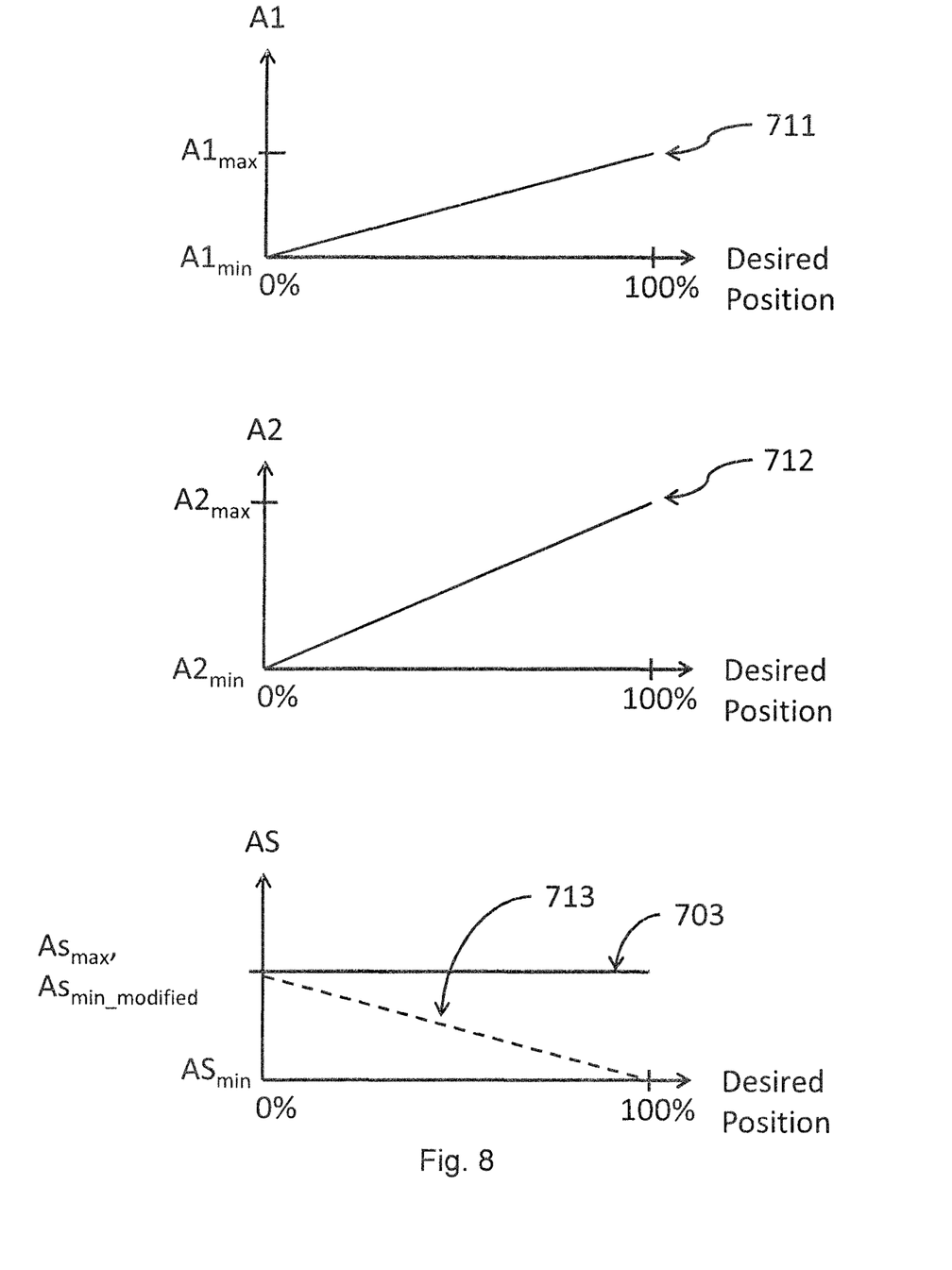
FIG. 8 provides graphs illustrating the predetermined relation when operating in single action operational mode according to one or more embodiments of the present disclosure.

FIG. 8 shows the predetermined relation when operating in single action operational mode according to one or more embodiments of the present disclosure. In an embodiment, the user input data is further indicative of a single action operational mode. The predetermined relation is further dependent on the single action operational mode.

In an example, the user input data may further be indicative of a user's desire to operate in single action operational mode, i.e. using a single-acting hydraulic actuator. This indication may be provided by pressing a button or providing a memory setting. A modified predetermined relation can then be used to determine the opening area values of the one or more actuator valves 141-143 and determine the opening area value of the shunt valve 130.

In an embodiment, the method may further comprise generating a modified predetermined relation and determine the opening area values of the one or more actuator valves 141-143 and determine the opening area value of the shunt valve 130 based on the modified predetermined relation.

In FIG. 8, a nominal predetermined relation, symbolized by the dashed line 713 is shown, e.g. the predetermined relation described in relation to FIG. 5. The modified predetermined relation, symbolized by line 703, may then be generated based on the nominal predetermined relation. In the example shown in FIG. 8, the predetermined relation or nominal predetermined relation is directly proportional to the desired position, i.e. a straight line, and having the minimum opening area $AS_{min}$ of the shunt valve 130, e.g. as further described in relation to FIG. 5. A modified predetermined relation is then generated by introducing an increased minimum opening area $AS_{min\_modified}$ of the shunt valve 130, e.g. equal to $AS_{max}$ of the shunt valve 130. In one example, a driver or other person configuring the hydraulic system indicates that he wishes a hydraulic actuator to operate in single action operational mode, e.g. effectively letting the gravitational force and not the hydraulic fluid bring the load carried by a front loader lifting arm down. This situation is achieved by leaving the opening area AS of the shunt valve 130 at the maximum opening area $AS_{max}$, whereas the opening areas of the one or more one or more actuator valves 141-143 are controlled using a predetermined relation similar to the one shown in FIG. 5.

Figure 9:
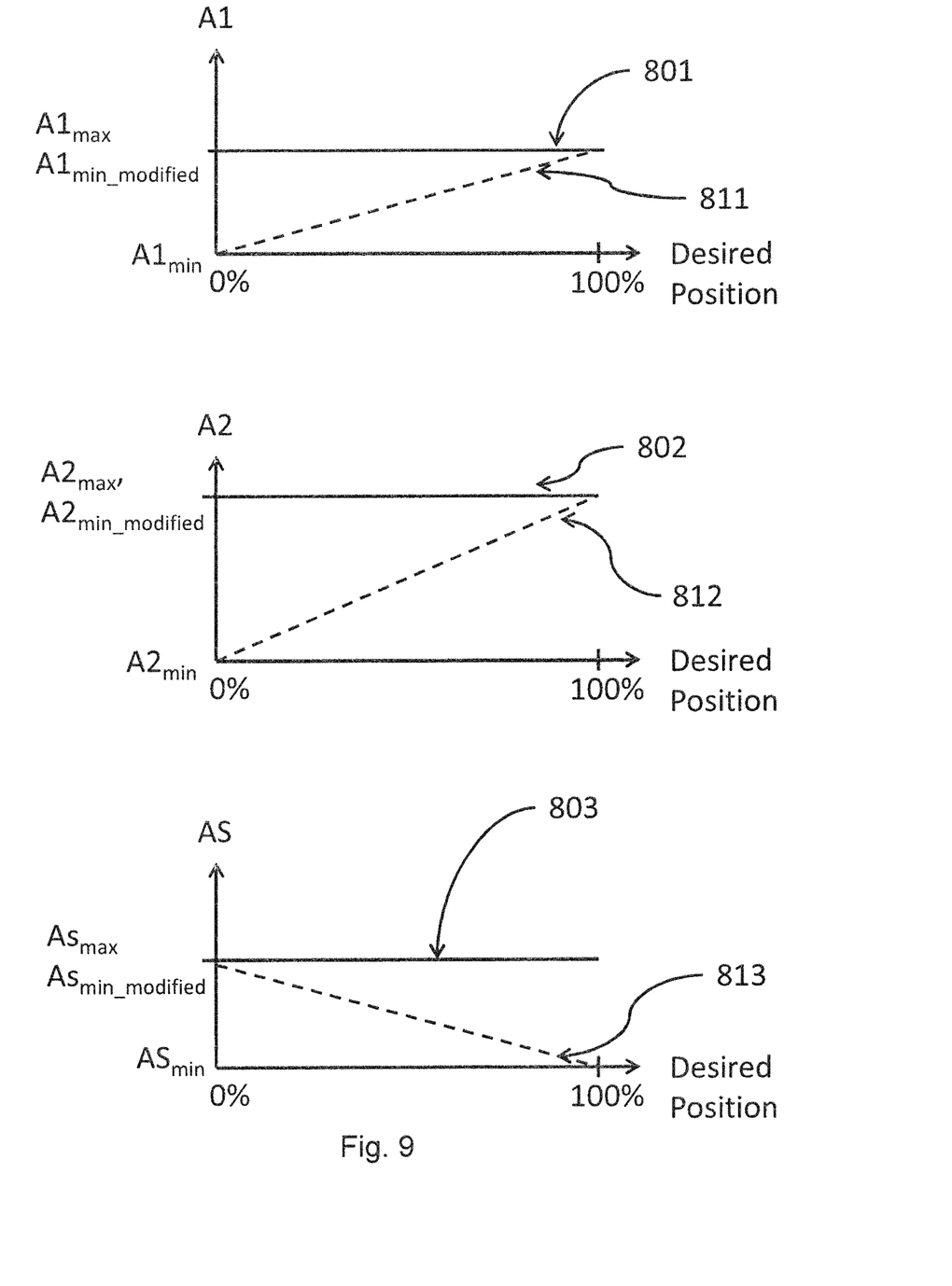
FIG. 9 provides graphs illustrating the predetermined relation when operating in depressurization operational mode according to one or more embodiments of the present disclosure.

FIG. 9 shows the predetermined relation when operating in depressurization operational mode according to one or more embodiments of the present disclosure. In an embodiment, the user input data is further indicative of a desired depressurization operational mode. The predetermined relation is further dependent on the depressurization operational mode. In an embodiment, the predetermined relation provides an opening area value of the shunt valve being equal to the maximum opening area $AS_{max}$ value and at least one opening area value of the opening area values of the one or more actuator valves being greater than zero.

In an example, the user input data may further be indicative of a user's desire to operate a depressurization operational mode, i.e. a desire to let any pressurized fluid in the system back to the tank 123, e.g. to make it easier to release hydraulic connectors to a removable hydraulic actuator. This indication may be provided by pressing and holding a button, e.g. on a joystick. A modified predetermined relation can then be used to determine the opening area values of the one or more actuator valves 141-143 and determine the opening area value of the shunt valve 130.

In an embodiment, the method may further comprise generating a modified predetermined relation and determine the opening area values of the one or more actuator valves 141-143 and determine the opening area value of the shunt valve 130 based on the modified predetermined relation.

In an embodiment, the modified predetermined relation is only used for a limited time. In one example, the user indicates the desire to operate the depressurization operational mode by pressing a button. The modified predetermined relation is only used for a brief period of time, e.g. <1 second. Just enough to let any pressurized fluid in the system back to the tank 123. In FIG. 9, a nominal predetermined relation, symbolized by the dashed lines 811, 812, 813 is shown, e.g. the predetermined relation described in relation to FIG. 5. The modified predetermined relation, symbolized by lines 801, 802 and 803, may then be generated based on the nominal predetermined relation.

In the example shown in FIG. 9, the predetermined relation or nominal predetermined relation is directly proportional to the desired position, i.e. a straight line, and having the minimum opening area $AS_{min}$ of the shunt valve 130, e.g. as further described in relation to FIG. 5. A modified predetermined relation is then generated by introducing an increased minimum opening area $A1_{min\_modified}$ of the first actuator valve 141, an increased minimum opening area $A2_{min\_modified}$ of the second actuator valve 142, and an increased minimum opening area $AS_{min\_modified}$ of the shunt valve 130 and generating the modified predetermined relation based on $A1_{min\_modified}$, $A2_{min\_modified}$ and $AS_{min\_modified}$. In the example shown in FIG. 9, the minimum opening area $A1_{min\_modified}$ minimum opening area $A1_{min\_modified}$ is increased to $A1_{max}$, the minimum opening area $A2_{min\_modified}$ is increased to $A2_{max}$, and the minimum opening area $AS_{min}$ is increased to $AS_{max}$.

In one example, a driver wishes to remove or eliminate fluid pressure from the connectors of a removable hydraulic function. He may then press a button to indicate the same, effectively sending excess hydraulic fluid back to the tank 123. This sending is achieved by letting hydraulic fluid or oil to flow from one or more actuators to the tank. The hydraulic actuator of the hydraulic function is of a double action type, e.g. as shown in relation to FIGS. 3A-3B. The fluid pressure is then removed or eliminated by first controlling the actuator valve to the position shown in FIG. 3A and then to a position shown in FIG. 3B. This will first remove pressure from the first actuator port 1414, 1424 and then from the second actuator port 1415, 1425.

As previously described, the opening area value AS of the shunt valve 130 controls or determines the fluid flow and/or fluid pressure provided to the one or more actuator valves 141-143. Depending on the number of actuators activated simultaneously or the opening area values A1-A2 of the one or more actuator valves 141-143, the fluid flow and/or fluid pressure may vary. This may affect the power and speed of which a particular hydraulic actuator operate with. This problem is solved by the embodiment described below:

In one or more embodiments, determining the opening area value AS of the shunt valve 130 is further based on or using the determined opening area values A1-A2 of the one or more actuator valves 141-143. In an embodiment, determining the opening area value AS of the shunt valve further comprises determining a desired opening area value of the shunt valve $AS_{desired}$, wherein determining the opening area value of the shunt valve is further based on the desired opening area value of the shunt valve $AS_{desired}$. In an embodiment, the desired opening area value of the shunt valve $AS_{desired}$, is determined using the relation:

$$AS_{desired} = \sqrt{\frac{A1^2 \cdot A2^2 \cdot \ldots \cdot AN^2}{A1^2 + A2^2 + \ldots + AN^2}}$$

In an embodiment, the desired opening area value of the shunt valve $AS_{desired}$, is determined using the relation:

$$AS_{desired} = \max(A1, A2, \ldots, AN) + \left(\sum_{i=1}^{N} A_i - \max(A1, A2, \ldots, AN)\right) * f$$

where max(A1, A2, . . . , AN) denotes the maximum determined opening area of the one or more actuator valves 141-143, $\sum_{i=1}^{N} A_i$ is the sum of all determined opening areas of the one or more actuator valves 141-143 and f is a factor in the range [0-100].

In an embodiment, the opening area value of the shunt valve is determined using the relation:

$$AS = \left\{ \begin{array}{l} AS_{max}, \text{ if } AS_{desired} > AS_{max} \\ AS_{desired}, \text{ if } AS_{desired} \leq AS_{max} \end{array} \right\}$$

At least one advantage of this embodiment is that variations in the fluid flow is reduced, by adapting the offered fluid flow to the number of hydraulic functions activated.

In one embodiment, a method for a hydraulic valve control unit (200), the method comprising:
obtaining user input data indicative of at least a desired actuator's (151-153) position, determining opening area values of the one or more actuator valves (141-143) using a predetermined relation dependent on the user input data,
determining an opening area value of the shunt valve (130) using the predetermined relation dependent on the user input data,
controlling the shunt valve (130) based on the opening area value of the shunt valve, and
controlling the one or more actuator valves (141-143) based on the opening area values of the one or more actuator valves (141-143).

In one embodiment, the method further comprising obtaining sensor data indicative of a hydraulic fluid output flow of the pump (121), wherein the predetermined relation is further dependent on the output flow of the pump.

In an embodiment, the method further comprises repeating the preceding method steps. In one embodiment, where the user input data is further indicative of a desired high pressure low flow operational mode, wherein the predetermined relation is further dependent on the high pressure low flow operational mode.

In one embodiment, where the predetermined relation provides decreased opening area values (601, 602) of the one or more actuator valves relative to nominal opening area values (611, 612) of the one or more actuator valves.

In one embodiment, where the user input data is further indicative of a desired single action operational mode, wherein the predetermined relation is further dependent on the single action operational mode.

In one embodiment, where the predetermined relation provides an opening area value (AS) of the shunt valve being equal to a maximum opening area ($AS_{max}$) value of the shunt valve and the opening area values of the one or more actuator valves (141-143) dependent on the user input data.

In one embodiment, where the user input data is further indicative of a desired depressurization operational mode, wherein the predetermined relation is further dependent on the depressurization mode operational mode. In one embodiment, where the predetermined relation provides an opening area value of the shunt valve being equal to the maximum opening area ($AS_{max}$) value and at least one opening area value of the opening area values of the one or more actuator valves being greater than zero.

In one embodiment, where the method step of determining the opening area value of the shunt valve is further based on the opening area values of the one or more actuator valves.

In one embodiment, a computer program is provided comprising computer-executable instructions for causing the hydraulic valve control unit 200 when the computer-executable instructions are executed on a processing unit comprised in the hydraulic valve control unit 200, to perform any of the methods described herein. Furthermore, any methods according to embodiments of the invention may be implemented in a computer program, having code means or codes, which when run by processing means causes the processing means to execute the steps of the method. The computer program is included in a computer readable medium of a computer program product. In one embodiment, a computer program product is provided comprising a computer-readable storage medium, the computer-readable storage medium having the computer program above embodied therein. The memory and/or computer-readable storage medium referred to herein may comprise of essentially any memory, such as a ROM (Read-Only Memory), a PROM (Programmable Read-Only Memory), an EPROM (Erasable PROM), a Flash memory, an EEPROM (Electrically Erasable PROM), or a hard disk drive. In one embodiment, a carrier containing the computer program above, wherein the carrier is one of an electronic signal, optical signal, radio signal, or computer readable storage medium.

In embodiments, the communications network communicate using wired or wireless communication techniques that may include at least one of a Local Area Network (LAN), Metropolitan Area Network (MAN), Global System for Mobile Network (GSM), Enhanced Data GSM Environment (EDGE), Universal Mobile Telecommunications System, Long term evolution, High Speed Downlink Packet Access (HSDPA), Wideband Code Division Multiple Access (W-CDMA), Code Division Multiple Access (CDMA), Time Division Multiple Access (TDMA), Bluetooth®, Zigbee®, Wi-Fi, Voice over Internet Protocol (VoIP), LTE Advanced, IEEE802.16m, WirelessMAN-Advanced, Evolved High-Speed Packet Access (HSPA+), 3GPP Long Term Evolution (LTE), Mobile WiMAX (IEEE 802.16e), Ultra Mobile Broadband (UMB) (formerly Evolution-Data Optimized (EV-DO) Rev. C), Fast Low-latency Access with Seamless Handoff Orthogonal Frequency Division Multiplexing (Flash-OFDM), High Capacity Spatial Division Multiple Access (iBurst®) and Mobile Broadband Wireless Access (MBWA) (IEEE 802.20) systems, High Performance Radio Metropolitan Area Network (HIPERMAN), Beam-Division Multiple Access (BDMA), World Interoperability for Microwave Access (WiMAX) and ultrasonic communication, etc., but is not limited thereto. Moreover, it is realized by the skilled person that the hydraulic valve control unit 200 may comprise the necessary communication capabilities in the form of e.g., functions, means, units, elements, etc., for performing the present solution. Examples of other such means, units, elements and functions are: processors, memory, buffers, control logic, encoders, decoders, rate matchers, de-rate matchers, mapping units, multipliers, decision units, selecting units, switches, interleavers, de-interleavers, modulators, demodulators, inputs, outputs, antennas, amplifiers, receiver units, transmitter units, DSPs, MSDs, encoder, decoder, power supply units, power feeders, communication interfaces, communication protocols, etc. which are suitably arranged together for performing the present solution.

Especially, the processor and/or processing means of the present disclosure may comprise one or more instances of processing circuitry, processor modules and multiple processors configured to cooperate with each-other, Central Processing Unit (CPU), a processing unit, a processing circuit, a processor, an Application Specific Integrated Circuit (ASIC), a microprocessor, a Field-Programmable Gate Array (FPGA) or other processing logic that may interpret and execute instructions. The expression "processor" and/or "processing means" may then represent a processing circuitry comprising a plurality of processing circuits, such as, e.g., any, some or all of the ones mentioned above. The processing means may further perform data processing functions for inputting, outputting, and processing of data comprising data buffering and device control functions, such as call processing control, user interface control, or the like.

Finally, it should be understood that the invention is not limited to the embodiments described above, but also relates to and incorporates all embodiments within the scope of the appended independent claims.

While various embodiments have been chosen to illustrate the invention, it will be understood by those skilled in the art that various changes and modifications can be made therein without departing from the scope of the invention as defined in the claims.

The invention claimed is:

1. An open center hydraulic system, comprising:
a pump;
a shunt valve connected in fluid communication to the pump;
an actuator valve being coupled in fluid communication to the shunt valve and being coupled to in fluid communication and controlling an actuator; and
a hydraulic valve control unit being connected to the shunt valve and the actuator valve, including a processor and a memory containing instructions executable by the processor and being configured to obtain user input data indicative of a desired position of the actuator to determine an opening area value of the actuator valve using a predetermined relation dependent on the user input data, to determine an open area value of the shunt valve using the predetermined relation dependent on the user input data, to control the shunt valve based on the opening area value of the shunt valve and to control the actuator valve based on the opening area value of the actuator valve, the user input data being indicative of a desired single action operational mode with the predetermined relation being dependent on the single action operational mode, the predetermined relation providing the open area value of the shunt valve being equal to a maximum opening area value of the shunt valve with the opening area value of the actuator valve being dependent on the user input data.

2. An open center hydraulic system according to claim 1 wherein
the hydraulic valve control unit is configured to obtain sensor data indicative of a hydraulic fluid outlet flow of a pump connected to the shunt valve, the predetermined relation being dependent on the hydraulic fluid outflow of the pump.

3. An open center hydraulic system according to claim 1 wherein the hydraulic valve control unit is configured to repeat operation thereof.

4. An open center hydraulic system according to claim 1 wherein
the user input data is indicative of a desired high-pressure, low flow operational mode, the predetermined relation being dependent on the desired high-pressure, low flow operational mode.

5. An open center hydraulic system according to claim 1 wherein
the predetermined relation provides decreased open area values of the actuator valve relative to a nominal opening area value of the actuator valve.

6. An open center hydraulic system, comprising:
a pump;
a shunt valve connected in fluid communication to the pump;
an actuator valve being connected in fluid communication to the shunt valve and being connected in fluid communication to and controlling an actuator; and
a hydraulic valve control unit including a processor and a memory containing instructions executable by the processor and being configured to obtain user input data indicative of a desired actuator position, to determine an open area value of the actuator valve using a predetermined relation dependent on the user input data, to determine an open area value of the shunt valve using the predetermined relation dependent on the user input data, to control the shunt valve based on the opening area value of the shunt valve and to control the actuator valve based on the open area value of the actuator valve, the user input data being indicative of a desired depressurization mode, the predetermined relation being dependent on the desired depressurization operational mode, the predetermined relation providing the open area value of the shunt valve being equal to a maximum opening area value with the open area value of the actuator valve being greater than zero.

* * * * *